United States Patent [19]
Niedermeyer

[11] 4,190,036
[45] Feb. 26, 1980

[54] SOLAR ENERGY COLLECTOR-LIGHT EMITTING PANEL

[76] Inventor: William P. Niedermeyer, 1024 Mt. Mary Dr., Green Bay, Wis. 54301

[21] Appl. No.: 828,496

[22] Filed: Aug. 29, 1977

[51] Int. Cl.² ............................................. F24J 3/02
[52] U.S. Cl. ................................................. 126/439
[58] Field of Search ............... 126/270, 271; 350/296, 350/293

[56] References Cited

U.S. PATENT DOCUMENTS

| | | | |
|---|---|---|---|
| 2,907,318 | 10/1959 | Awot | 126/271 |
| 3,982,527 | 9/1976 | Cheng et al. | 126/271 |
| 4,000,733 | 1/1977 | Pauly | 126/270 |
| 4,003,638 | 1/1977 | Winston | 126/271 |
| 4,011,855 | 3/1977 | Eshelman | 126/270 |
| 4,068,474 | 1/1978 | Dimitroff | 126/271 |

Primary Examiner—Carroll B. Dority, Jr.
Attorney, Agent, or Firm—Francis J. Bouda

[57] ABSTRACT

This invention relates to a solar energy collector which utilizes spaced-apart shaped reflector surface supports and a reflective surface with apertures selectively located so that the device collects a portion of the solar energy to transmit same through conductors, and also allows a smaller portion of the solar energy to be passed to the side opposite the reflector surface, this device thereby being a combination solar energy collector and light-emitting panel.

2 Claims, 11 Drawing Figures

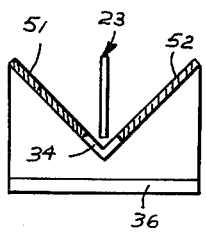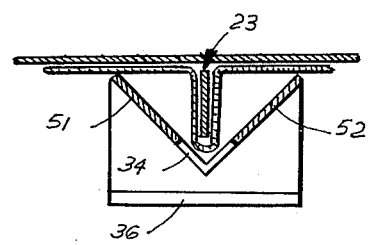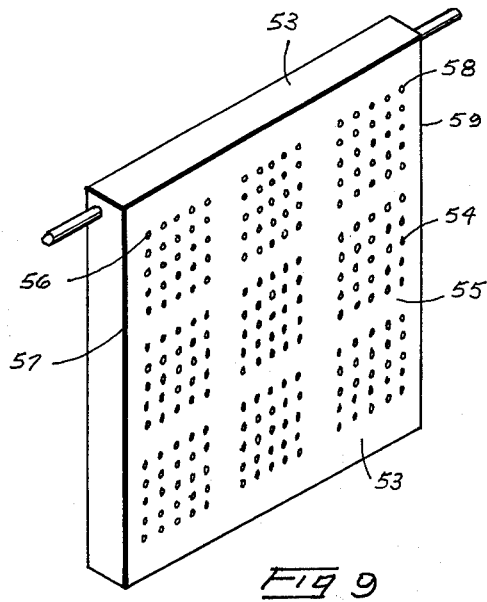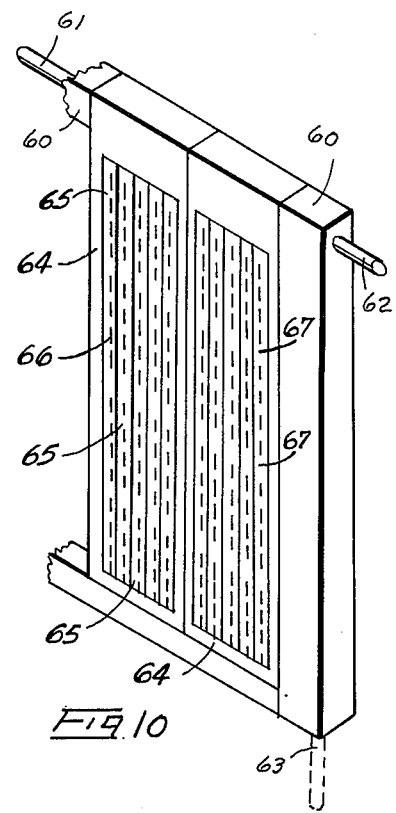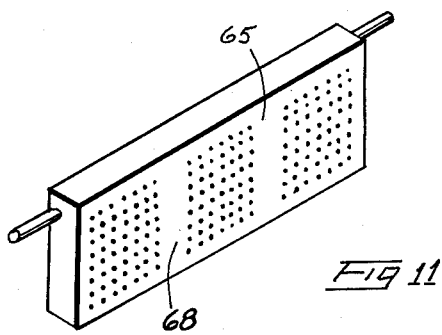

SOLAR ENERGY COLLECTOR-LIGHT EMITTING PANEL

BACKGROUND OF THE INVENTION

Using various elements of my co-pending patent applications, Ser. No. 804,767 filed June 8, 1977, now U.S. Pat. No. 4,141,340, and Ser. No. 828,497 filed Aug. 29, 1977 this device achieves a unique result.

Prior teaching of solar collector art is concerned primarily with efficient utilization of reflective or absorptive surfaces to collect rays and transmit heat. The objective of collecting solar rays for heat energy transmission and the desirability of admitting solar light energy into an enclosed area are not compatible unless lower heat collecting efficiencies are an acceptable axiom.

This invention discloses a unique combination of elements and a realistic compromise that is feasible because panel construction is relatively simple and uses inexpensive elements.

Louvered arrangements (for example, well-known "Venetian blinds") could in simplest terms be considered as a combination of an adjustable heat collector with light transmitting mechanism, conceding the difficulty of directing reflected rays to an absorber means which is stationary within the collector panel.

Louvers with parallel non-intersecting planes are described in several prior art teachings, for example, U.S. Pat. Nos. 3,863,621 and 3,971,359.

In U.S. Pat. No. 3,971,359 for example, louvers are selectively angled to permit a substantial portion of solar rays to pass therebetween when the sun is low, and in this context, allows solar rays to be absorbed by an absorptive coated surface particularly when needed; i.e., in winter.

It is noted that an absorber surface rather than an absorber conductor is used to collect heat energy. This arrangement allows lower reflected rays to impinge and be absorbed within the collector by selectively coated louvers on other internal surfaces. The surface area of absorbing means in U.S. Pat. No. 3,971,359 are relatively large and do not suggest concentration ratios of higher than 1:1.

In the teaching of U.S. Pat. No. 3,971,359, heat transfer to air is defined. U.S. Pat. No. 3,863,621 refers to an apertured collector plate as being one which has metal or other materials displaced but not specifically removed. It is also noted that the above patents relate to panels installed vertically. There are many applications where the objective of solar energy collection and light transmission are desirable, (greenhouses, enclosed swimming pools, display areas, lobbies, etc.), and this invention addresses itself to the many advantages of design and use flexibility.

OBJECTIVE

It is the primary objective of this invention to provide a solar energy collector that allows a portion of impinging solar rays to be transmitted without interference as light rays, and a portion of said solar rays to be absorbed as useful heat energy.

It is a further object of this invention to provide a solar energy collector-light transmitting means that is suitable for installation at various angles to the sun's rays.

It is a further object of this invention to provide a solar energy collector that can be easily installed outside or inside a building with a minimum of piping.

It is further an object of this invention to provide a means wherein the reflector surface is flexible and thin gauge for ease of punching or forming apertures therein on a continuous basis.

It is a further object of this invention to provide a means wherein the reflector surface is supported at spaced intervals by a supportive curved member made of inexpensive materials and fabricated on a continuous basis.

It is a further objective of this invention to provide a solar energy collector means wherein the design allows aesthetically pleasing results from both front and rear when using a plurality of panels.

Other objects will become evident in the detailed description of this invention.

DESCRIPTION OF THE DRAWINGS

FIG. 7 is a sectional view similar to FIG. 3 showing a low concentrator ratio construction and planar reflective surfaces.

FIG. 8 is a sectional view similar to FIG. 7 with a two-piece formed enclosure for the conductor.

FIG. 9 is a perspective view from the rearside of a plurality of light emitting panels.

FIG. 10 is a perspective front view of FIG. 9 showing two panels.

FIG. 11 is a perspective rear view of a unit panel similar to FIG. 9 but with internal parts oriented differently.

DESCRIPTION OF THE INVENTION

Using the simplified and inexpensive means to achieve spaced apart parabolic or other shaped support surfaces and reflector surfaces mounted thereon, as taught in my co-pending patent application, Ser. No. 828,497 filed Aug. 29, 1977 it is noted that the space between said supports will allow light transmission from an aperture in the reflective surface to a rear (or bottom) panel member that is transparent or translucent, whereby a pattern of light emitting spots as shown in FIG. 9 and FIG. 11 will appear.

Figure 1:
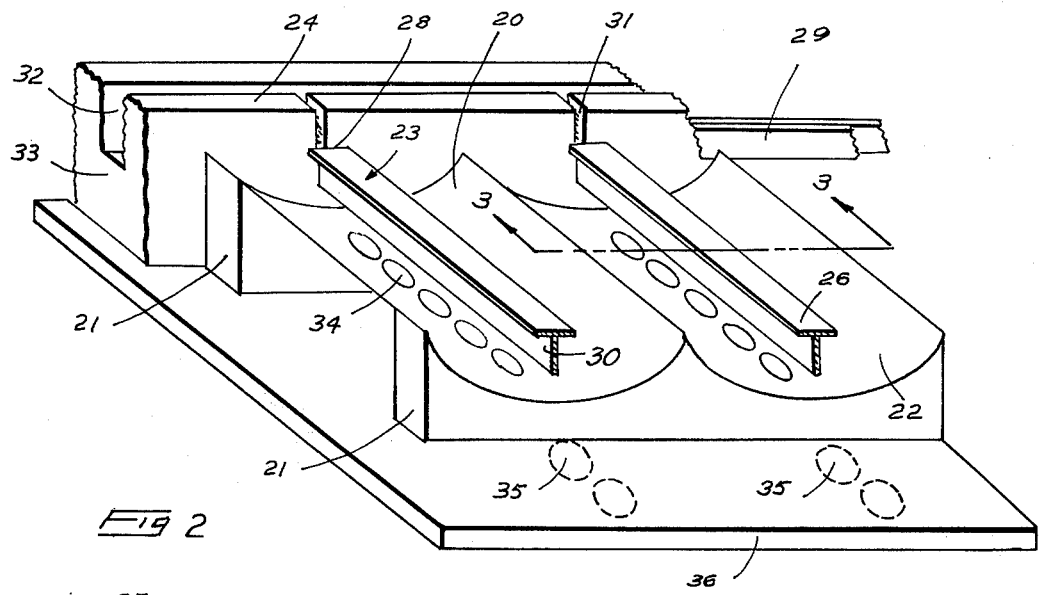
FIG. 1 is a perspective view of one embodiment of the present invention.

In FIG. 1, the solar heat collector-light transmitting panel 20 includes shaped support members 21 which are spaced apart to support a reflective surface substrate 22 thereupon.

Heat absorbing conductor means 23 are held in fixed relationship to surface 22 by rigid portions 24 of outer supporting means and by oppositely disposed support means (not shown).

The top surface 26 of the heat absorbing conductor means can be arranged below the top edge of parabolic shaped reflector surface 22 and the top surface 26 is arranged to terminate at point 28 before an extended portion 29 of the vertical part 30 of conductor 23 passes through slots 31 into channel 32 of end piece 33 and into contact with fluid-carrying heat transfer pipes (not shown but as disclosed in my co-pending application Ser. No. 804,767, now U.S. Pat. No. 4,141,340).

The reflective surface is punched, punctured, or otherwise apertured along a line or plurality of lines substantially central of said surface, said lines being parallel with the conductor 23.

Typical apertures 34 are shown on reflective surface 22, and at 35 are shown dotted as they appear on the surface of sub planar contact surface or member 36.

Figure 2:
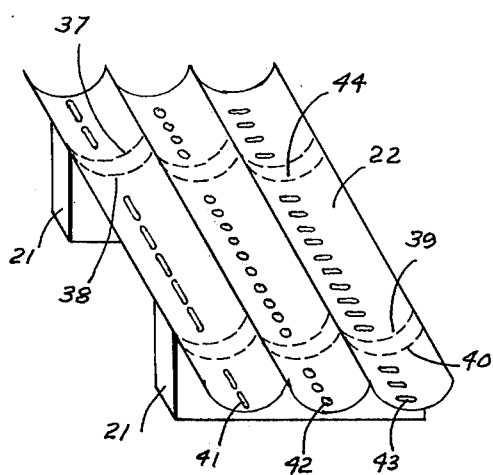
FIG. 2 is a perspective view showing the preferred reflective surface with several different types of apertures.

When sub-planar member 36 is a transparent or transluscent member such as glass or a clear plastic material such as "LUCITE", said dotted spots of light will appear as a pattern of light spots per FIG. 9 and FIG. 11. In FIG. 2, a plurality of reflective surfaces 22 are shown supported by shaped spaced apart members 21. The relative position of members 21 under the reflector surface is shown dotted at lines 37, 38, 39, and 40, to more fully explain the resultant pattern of light spots per FIG. 9 and FIG. 11 since light spots will not substantially pass through members 21 even when it is made from corrugated paperboard materials.

Apertures of various shapes 41, 42, 43, can be advantageously used to produce different light effects. It is noted that non-apertured portions of web 44 are advantageously used to maintain strength and unity of the reflector substrate, this being desirable for processing and maintaining continuity of at least portions of the substrate when fabricating the substrate into a plurality of reflector surfaces.

Figure 3:
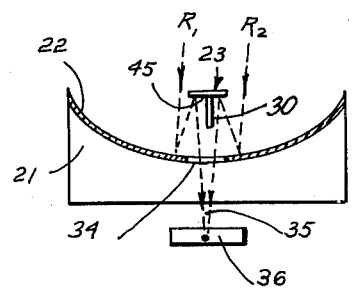
FIG. 3 is a section along line 3—3 of FIG. 1.

FIG. 3 shows a sectional view of a singular shaped reflector surface composed of shaped member 21, reflector surface 22, aperture 34 and light pattern 35 on substrate 36. Solar rays $R_1$ and $R_2$ are shown at a slight angle from the optimum heat collecting mode. Rays $R_1$ for example will reflect from the surface of 22 to the underside 45 of conductor 23. In this embodiment, underside 45 can be selectively made reflective so that any light rays incident thereupon will be re-reflected back through aperture 34 and on to and through sub-planar surface panel 36.

Figure 4:
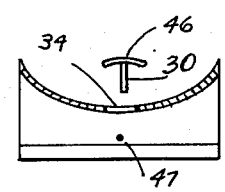
FIG. 4 is a section similar to FIG. 3 showing another type of conductor construction.

FIG. 4 shows a variation of the conductor wherein the top portion 46 is curved with an effective radius to a focus point 47 central to the aperture 34.

Figure 5:
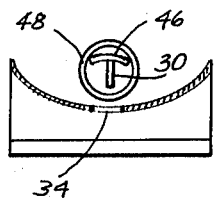
FIG. 5 is a section similar to FIG. 3 showing a different conductor and enclosure.

FIG. 5 shows the same arrangement as FIG. 4 with conductor 46 encased in a transparent tubular cover 48.

Figure 6:
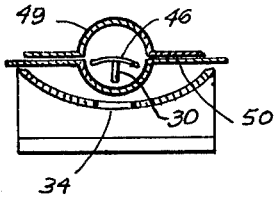
FIG. 6 shows a sectional view similar to FIG. 5 with a two-part enclosure.

FIG. 6 shows a similar embodiment with a protective shroud being formed from two rigid transparent plastic members 49 and 50, each having a substantially semicircular longitudinal trough molded therein. It is within the scope of this invention to utilize other conductor shapes, for example, "Z" or "I" shaped or substantially flat vertical strip mounted with the major dimension arranged vertically.

FIGS. 7 and 8 show similar conductor shapes with flat planar reflective surfaces 51 and 52 directing reflected solar rays to a central absorber conductor which can be shrouded or encased etc.

The scope of the invention covers use of a tubular or round conductor means, either of which are selectively, reflectively coated over an arcuate underlying portion to receive and transmit reflected solar rays to the light emitting member. Conductor means of all shapes can also be arranged to rotate about their longitudinal axis.

FIG. 9 shows a plurality 53 of side by side vertically mounted panels. Spots 54 represent an approximation of patterns due to the effect of light transmission to the non-reflective side thereof, albeit the inability to show a reversal of dark and light, and the inability to show the "overlapping" of lighted areas. Voids 55 represent areas that are directly behind reflective surface supports which in this Figure are mounted horizontally with support terminal ends being between spot 56 and panel edge 57 and between spot 58 and panel edge 59.

FIG. 10 shows a plurality of solar collector-light emitting panels of this invention viewed from the reflective surface. Panels 64 are shown with a plurality of reflective grooves 65 arranged vertically as in FIG. 9 with a pattern of apertures 66 shown, and with void areas 55 representing the absence of apertures and the absence of "light spots" on the reverse side of the panel. This arrangment also shows the use of edge sections 60 which contain and insulate pipes 61, 62, and 63.

FIG. 11 shows a single panel mounted horizontally with void areas 68 representing the absence of transmitted light due to placement of internal spaced supports.

With the devices of the present invention, a solar energy collecting panel can be placed over a window-opening in a building in such fashion that a portion of the sun's rays are collected as heat and a portion transmitted through the panel as light so as to illuminate the room behind the window opening.

It is to be understood that the present invention may be embodied in other specific forms without departing from the spirit or special attributes hereof, and it is, therefore, desired that the present embodiments be considered in all respects as illustrative, and, therefore, not restrictive, reference being made to the appended claims rather than to the foregoing description to indicate the scope of the invention.

Having thus described my invention, what I claim as new and desire to protect by Letters Patent are the following:

1. In a solar energy concentrating collector, at least one parabolic reflective surface and at least one heat absorbing conductor means disposed in operative relation to said parabolic reflective surface, said heat absorbing conductor means arranged to absorb heat energy from solar rays directed thereto by the parabolic reflective surface, said heat absorbing conductor means having a surface treated to reflect visible portions of the solar rays back toward the said parabolic reflective surface, apertures in said parabolic reflective surface through which visible portions of the solar rays reflected from the treated surface of the heat absorbing conductor means may travel, and a contact surface behind the parabolic reflective surface against which the visible portions of the solar rays impinge whereby to illuminate portions of the said contact surface.

2. In a solar energy concentrating collector, at least one parabolic reflective surface and at least one heat absorbing conductor means disposed in operative relation to said parabolic reflective surface, said heat absorbing conductor means arranged to absorb heat energy from solar rays directed thereto by the parabolic reflective surface, said heat absorbing conductor means having a surface treated to reflect visible portions of the solar rays back toward the said parabolic reflective surface, apertures in said parabolic reflective surface through which visible portions of the solar rays reflected from the treated surface of the heat absorbing conductor means may travel, and a contact surface behind the parabolic reflective surface against which the visible portions of the solar rays impinge whereby to illuminate portions of the said contact surface, said contact surface being a substantially transparent member on which the visible portion of the said solar rays impinge.

* * * * *